(12) United States Patent
Kitahara

(10) Patent No.: US 10,792,808 B2
(45) Date of Patent: Oct. 6, 2020

(54) ROBOT AND ROBOT SYSTEM

(71) Applicant: Seiko Epson Corporation, Tokyo (JP)

(72) Inventor: Atsuto Kitahara, Shimosuwa (JP)

(73) Assignee: Seiko Epson Corporation (JP)

( * ) Notice: Subject to any disclaimer, the term of this patent is extended or adjusted under 35 U.S.C. 154(b) by 345 days.

(21) Appl. No.: 15/788,171

(22) Filed: Oct. 19, 2017

(65) Prior Publication Data

US 2018/0141210 A1   May 24, 2018

(30) Foreign Application Priority Data

Nov. 21, 2016   (JP) ................................ 2016-225732

(51) Int. Cl.
*B25J 9/16* (2006.01)
*G05B 19/414* (2006.01)

(52) U.S. Cl.
CPC ........... *B25J 9/161* (2013.01); *G05B 19/4141* (2013.01); *G05B 2219/33219* (2013.01)

(58) Field of Classification Search
CPC ................. B25J 9/161; G05B 19/4141; G05B 2219/33213; G05B 2219/33219; G05B 2219/25479; G05B 2219/25483; G05B 2219/33144; G05B 2219/33097; G05B 2219/33248; G05B 2219/34397
See application file for complete search history.

(56) References Cited

U.S. PATENT DOCUMENTS

| | | | | |
|---|---|---|---|---|
| 2010/0262287 A1* | 10/2010 | Ha | ........................... | B25J 9/161 700/248 |
| 2012/0056572 A1* | 3/2012 | Bigler | .................... | H02K 5/225 318/570 |
| 2012/0057479 A1* | 3/2012 | Maruyama | ......... | G05B 19/4185 370/252 |
| 2013/0131864 A1* | 5/2013 | Jody | ........................ | B25J 9/161 700/245 |
| 2015/0058432 A1* | 2/2015 | Mizutani | ................ | G05B 19/05 709/208 |
| 2015/0142382 A1* | 5/2015 | Osagawa | ................ | G04R 20/00 702/176 |
| 2016/0124412 A1* | 5/2016 | Fujita | ................ | H04L 12/40019 700/3 |
| 2018/0065244 A1* | 3/2018 | Jakunen | ................... | B25J 9/126 |

FOREIGN PATENT DOCUMENTS

| | | |
|---|---|---|
| JP | 11-167406 A | 6/1999 |
| JP | 2006-255797 A | 9/2006 |
| JP | 2015-205357 A | 11/2015 |

\* cited by examiner

*Primary Examiner* — Dale Moyer
(74) *Attorney, Agent, or Firm* — Harness, Dickey & Pierce, P.L.C.

(57) ABSTRACT

A robot includes a first control device; and one or more second control devices to be controlled by the first control device. The second control device controls a control target controlled by the second control device at a predetermined cycle. The predetermined cycle is determined based on first information received by the second control device from the first control device at a first time point and second information received by the second control device from the first control device at a second time point.

14 Claims, 7 Drawing Sheets

ROBOT AND ROBOT SYSTEM

BACKGROUND

1. Technical Field

The present invention relates to a robot and a robot system.

2. Related Art

Research and development of a technique for suppressing a load on a robot control device by causing each of a plurality of other control devices which are controlled by the robot control device to process at least a part of processing of the robot control device that controls a robot, are conducted.

In this regard, a distributed control system is known, in which a communication cable is provided with a signal line for transmitting and receiving a synchronization signal for sub-control devices to operate in cooperation with each other in the distributed control system in which a main control device and a plurality of the sub-control devices are connected to each other by a serial communication cable (see JP-A-11-167406).

However, in such a distributed control system, a cycle of the synchronization signal transmitted from the main control device may fluctuate by a load such as a processing load or a communication load on the main control device. As a result, in the distributed control system, a control cycle of the sub-control device may fluctuate. In addition, in the distributed control system, the communication cable connecting the main control device and the sub-control device to each other needs to have a signal line exclusive for transmitting and receiving the synchronization signal for synchronizing the main control device and the sub-control device, and the number of the signal line may be increased. As a result, in the distributed control system, it is difficult to reduce a cost required for the communication cable in some cases.

SUMMARY

An aspect of the invention is directed to a robot including a first control device; and one or more second control devices to be controlled by the first control device. The second control device controls a control target controlled by the second control device at a predetermined cycle. The predetermined cycle is determined based on first information received by the second control device from the first control device at a first time point and second information received by the second control device from the first control device at a second time point.

According to this configuration, in the robot, the second control device controls the control target controlled by the second control device at the predetermined cycle and the predetermined cycle is determined based on the first information received by the second control device from the first control device at the first time point and the second information received by the second control device from the first control device at the second time point. Therefore, in the robot, it is possible to suppress fluctuation of the predetermined cycle at which the second control device controls the control target.

In another aspect of the invention, the robot may be configured such that a plurality of the second control devices are provided.

According to this configuration, in the robot, for each of the plurality of second control devices, the second control device controls the control target controlled by the second control device at the predetermined cycle, and the predetermined cycle is determined based on the first information received by the second control device from the first control device at the first time point and the second information received by the second control device from the first control device at the second time point. Therefore, in the robot, it is possible to suppress fluctuation of the predetermined cycle at which the second control device controls the control target for each of the plurality of second control devices.

In another aspect of the invention, the robot may be configured such that communication between the first control device and the second control device is serial communication.

According to this configuration, in the robot, the communication between the first control device and the second control device is the serial communication. Therefore, in the robot, it is possible to suppress fluctuation of the predetermined cycle at which the second control device communicating with the first control device by the serial communication controls the control target.

In another aspect of the invention, the robot may be configured such that a standard of the serial communication is a controller area network.

According to this configuration, in the robot, the standard of the serial communication is the controller area network. Therefore, in the robot, it is possible to suppress fluctuation of the predetermined cycle at which the second control device communicating with the first control device by the serial communication which is performed based on the controller area network controls the control target.

In another aspect of the invention, the robot may be configured such that the first information and the second information include control parameters.

According to this configuration, in the robot, the first information and the second information include the control parameters. Therefore, in the robot, it is possible to suppress fluctuation of the predetermined cycle at which the second control device controls the control target based on the first information including the control parameters and the second information including the control parameters.

In another aspect of the invention, the robot may be configured such that the control target is a motor.

According to this configuration, in the robot, the second control device controls the motor controlled by the second control device at the predetermined cycle and the predetermined cycle is determined based on the first information received by the second control device from the first control device at the first time point and the second information received by the second control device from the first control device at the second time point. Therefore, in the robot, it is possible to suppress fluctuation of the predetermined cycle at which the second control device controls the motor.

In another aspect of the invention, the robot may be configured such that the second control device is provided in the motor.

According to this configuration, in the robot, the second control device is provided in the motor. Therefore, in the robot, it is possible to reduce the first control device in size as compared to a case where the first control device and the second control device are integrally configured.

In another aspect of the invention, the robot may be configured such that the robot further includes a base that supports a movable portion and the first control device may be provided inside the base.

According to this configuration, in the robot, the first control device is provided inside the base. Therefore, in the robot, it is possible to reduce an exclusive area of a range in which the robot is provided as compared to a case where the first control device is provided outside the base.

Another aspect of the invention is directed to a robot including a first control device; and one or more second control devices to be controlled by the first control device. A wiring connecting the first control device and the second control device to each other does not include a wiring used only for transmission of synchronization information.

According to this configuration, in the robot, the wiring connecting the first control device and the second control device to each other does not include the wiring used only for the transmission of the synchronization information. Therefore, in the robot, it is possible to cause the second control device to control the control target of the second control device at the predetermined cycle without having the wiring used only for the transmission of the synchronization information for synchronizing the first control device and the second control device.

Another aspect of the invention is directed to a robot system including the robot described above; the first control device; and the second control device.

According to this configuration, in the robot system, the second control device controls the control target controlled by the second control device at the predetermined cycle, and the predetermined cycle is determined based on the first information received by the second control device from the first control device at the first time point and the second information received by the second control device from the first control device at the second time point. Therefore, in the robot system, it is possible to suppress fluctuation of the predetermined cycle at which the second control device controls the control target.

Therefore, in the robot and the robot system, the second control device controls the control target controlled by the second control device at the predetermined cycle, and the predetermined cycle is determined based on the first information received by the second control device from the first control device at the first time point and the second information received by the second control device from the first control device at the second time point. Therefore, in the robot system, it is possible to suppress fluctuation of the predetermined cycle at which the second control device controls the control target.

In addition, in the robot, a wiring connecting the first control device and the second control device to each other does not include a wiring used only for the transmission of the synchronization information. Therefore, in the robot, it is possible to cause the first control device and the second control device to be synchronized without having the wiring used only for the transmission of the synchronization information for synchronizing the first control device and the second control device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, embodiments of the invention will be described with reference to the drawings.
Configuration of Robot First, a configuration of a robot 1 will be described.

Figure 1:
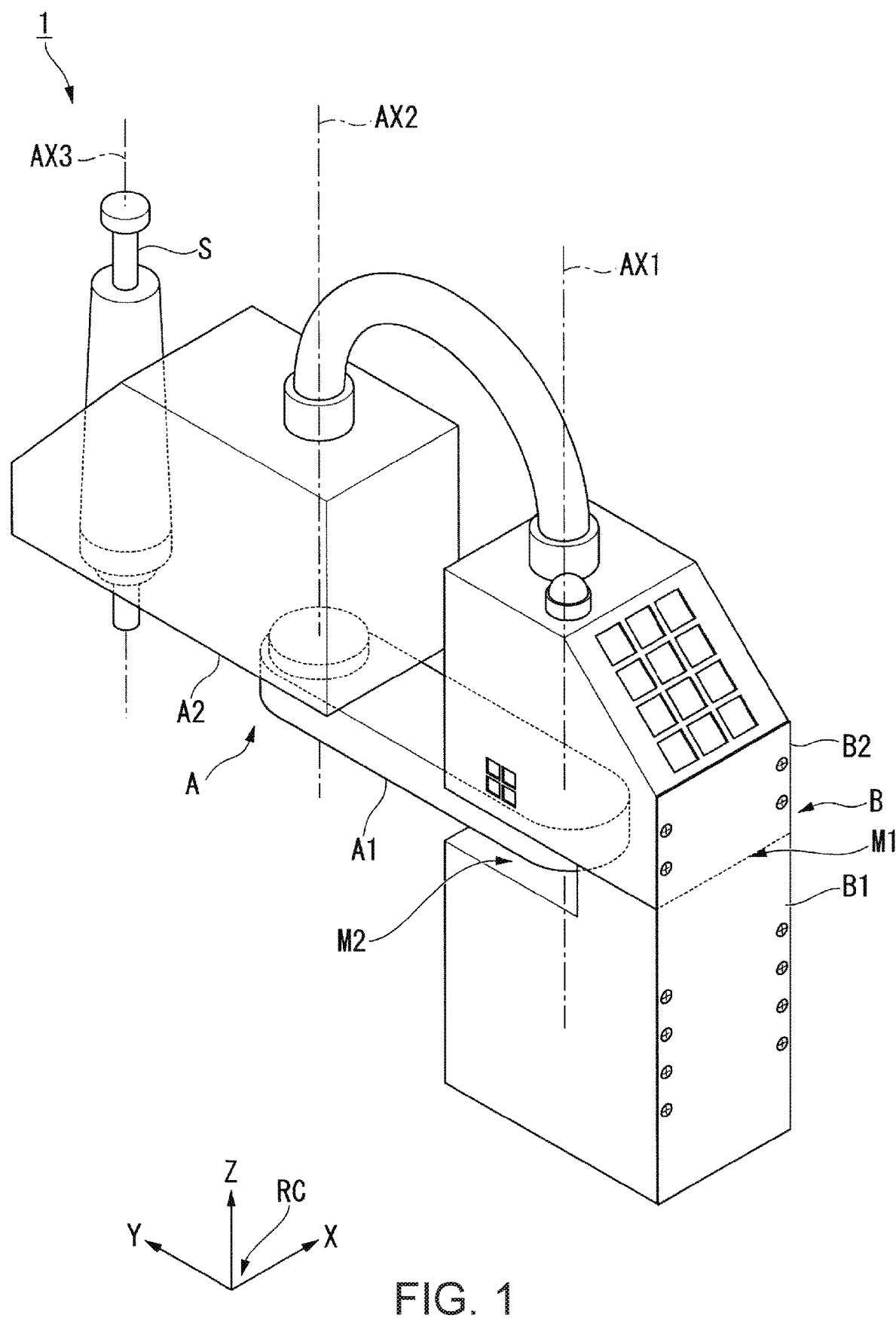
FIG. 1 is a view illustrating an example of a configuration of a robot according to an embodiment.

FIG. 1 is a view illustrating an example of the configuration of the robot 1 according to the embodiment. The robot 1 is a SCARA robot (horizontal articulated robot) having a support base B and a movable portion A that is supported by the support base B. Moreover, the robot 1 may be another robot such as a vertical articulated robot or a rectangular coordinate robot instead of the SCARA robot. Moreover, the vertical articulated robot may be a single-arm robot having one arm, may be a double-arm robot (multi-arm robot having two arms) having two arms, or a multi-arm robot having three or more arms. In addition, the rectangular coordinate robot is, for example, a gantry robot.

The support base B is configured of two portions. One of the portions is a base B1 and the other portion is a first housing B2. Moreover, the support base B may be configured of only the base B1.

The base B1 is installed on an installation surface such as a floor surface or a wall surface. The base B1 has a substantially rectangular parallelepiped (or may be a cube) shape as an outer shape, is configured of plate-like surfaces, and is hollow. The first housing B2 is fixed to a first upper surface M1 that is a part of an upper surface of the base B1. A space inside the base B1 is connected to a space inside the first housing B2. The upper surface of the base B1 is a surface opposite to the installation surface among surfaces of the base B1. In addition, a distance between a second upper surface M2 that is a portion other than the first upper surface M1 among the upper surfaces of the base B1 and the installation surface is shorter than a distance between the first upper surface M1 and the installation surface. Therefore, there is a gap between the second upper surface M2 and the first housing B2. In addition, the movable portion A is provided on the second upper surface M2. That is, the base B1 supports the movable portion A. Moreover, the shape of the base B1 may be another shape instead of such a shape as long as the base B1 can support the movable portion A and has a shape by which the first housing B2 can be fixed to a part of the upper surface of the base B1.

The first housing B2 has a shape cut off so as to remove a portion of a triangular shape including one vertex in each of two surfaces configuring a rectangular parallelepiped (or may be a cube) and facing each other in a direction perpendicular to the two surfaces as an outer shape. Here, the shape obtained by cutting off the relevant portions may not necessarily be configured by a process of cutting the relevant portions and, for example, may be initially configured by a process of forming a similar shape. The first housing B2 has such a polyhedral shape as the outer shape, is configured of the plate-like surfaces, and is hollow. Moreover, the shape of the first housing B2 may be another shape instead of such a shape as long as the first housing B2 has a shape which can be fixed on a part of the upper surface of the base B1.

The movable portion A includes a first arm A1 that is rotatably supported around a first axis AX1 by the base B1, a second arm A2 that is rotatably supported around a second axis AX2 by the first arm A1, and a shaft S that is supported by the second arm A2 so as to be rotatable around a third axis AX3 and translatable in an axial direction of the third axis AX3.

The shaft S is a cylindrical shaft body. A ball screw groove (not illustrated) and a spline groove (not illustrated) are respectively formed on a peripheral surface of the shaft S. In the example, the shaft S is provided to penetrate an end portion of end portions of the second arm A2, on a side opposite to the first arm A1 in a first direction that is a direction perpendicular to the installation surface on which the support base B is installed. In addition, an end effector can be attached to an end portion of end portions of the shaft S, on a side of the installation surface. The end effector may be an end effector capable of grasping an object, may be an end effector capable of adsorbing an object using air, magnetism, or the like, or may be another end effector.

In the example, the first arm A1 rotates around the first axis AX1 to move in a second direction. The second direction is a direction orthogonal to the first direction. The second direction is, for example, a direction along an XY plane in a world coordinate system or a robot coordinate system RC. The first arm A1 is rotated around the first axis AX1 by a first motor 41 included in the support base B. That is, the first axis AX1 is an axis that coincides with a rotation axis of the first motor 41. Moreover, in FIG. 1, the first motor 41 is omitted in order to simplify the drawing.

In the example, the second arm A2 rotates around the second axis AX2 to move in the second direction. The second arm A2 is rotated around the second axis AX2 by a second motor 42 included in the second arm A2. That is, the second axis AX2 is an axis that coincides with a rotation axis of the second motor 42. Moreover, in FIG. 1, the second motor 42 is omitted in order to simplify the drawing.

In addition, the second arm A2 includes a third motor 43 and a fourth motor 44, and supports the shaft S. The third motor 43 moves (moves up and down) the shaft S in the first direction by rotating a ball screw nut provided on an outer peripheral portion of the ball screw groove of the shaft S with a timing belt or the like. The fourth motor 44 rotates the shaft S around the third axis AX3 by rotating a ball spline nut provided on an outer peripheral portion of the spline groove of the shaft S with a timing belt or the like. Moreover, in FIG. 1, the third motor 43 and the fourth motor 44 are omitted in order to simplify the drawing.

Hereinafter, as an example, a case where the first motor 41 to the fourth motor 44 respectively have all the same configurations will be described. In addition, hereinafter, for the sake of convenience of description, unless it is necessary to distinguish each of the first motor 41 to the fourth motor 44, it will be described to be referred to as a motor 4. Moreover, a part or all of the motors 4 may be motors having different configurations from each other.

In addition, the robot 1 includes a first control device and one or more second control devices.

The first control device is a host control device of the second control device. That is, the first control device controls one or more second control devices and each of one or more second control devices is controlled by the first control device. More specifically, the first control device performs distributed control for distributing at least a part of processes performed by the first control device to each of one or more second control devices.

In the example, the first control device is a robot control device 30 not illustrated in FIG. 1. Moreover, the first control device may be another control device such as a further host control device that controls the robot control device 30 or a control device that is controlled by the robot control device 30 and controls the second control device instead of the robot control device 30.

In the robot 1, a part of the robot control device 30 is built in a space inside the base B1 and the remaining part of the robot control device 30 is built in a space inside the first housing B2. Therefore, the robot 1 can reduce an exclusive area of a range in which the robot 1 is provided as compared to a case where the robot control device 30 is provided outside the base B1 and the first housing B2. Moreover, the robot 1 may have a configuration in which the entire robot control device 30 is provided inside one of the base B1 and the first housing B2. In this case, in the robot 1, it is possible to reduce the exclusive area of the range in which the robot 1 is installed compared to a case where the robot control device 30 is provided outside the base B1 or the first housing B2. In addition, the robot 1 may have a configuration in which the robot control device 30 separated from the robot 1 is externally attached instead of the robot control device 30 being built in.

In addition, in the example, the robot 1 includes a motor control device that controls each of the motors 4 as one or more second control devices to be controlled by the robot control device 30 that is the first control device. That is, the motor 4 is an example of a control target that is controlled by the second control device. In addition, hereinafter, for the sake of convenience of description, the motor control device that controls the first motor 41 is referred to as a first motor control device 51, the motor control device that controls the second motor 42 is referred to as a second motor control device 52, the motor control device that controls the third motor 43 is referred to as a third motor control device 53, and the motor control device that controls the fourth motor 44 is referred to as a fourth motor control device 54. In addition, hereinafter, unless it is necessary to distinguish each of the first motor control devices 51 to the fourth motor control device 54, it will be described to be referred to as a motor control device 5. Moreover, the second control device may be another control device instead of the motor control device 5. For example, the second control device may be another control device such as a control device that controls the end effector as the control target, a control device that controls an imaging portion (camera) as the control target, a control device that controls various sensors such as a gyroscope or a force sensor as the control target, or a control device that controls an image processing device as the control target. In addition, in a case where the robot 1 and the robot control device 30 are configured separately, the robot 1, the robot control device 30 that is the first control device, and the motor control device 5 that is the second control device configure a robot system. In other words, the robot system includes the robot 1, the robot control device 30 as the first control device, and the motor control device 5 as the second control device.

Each of the motor control devices 5 is connected to the robot control device 30 so as to be able to communicate with the robot control device 30 by wire. Moreover, the wired communication is serial communication based on a controller area network (CAN) standard. In addition, each of the motor control devices 5 may be configured to be connected to the robot control device 30 to be able to communicate with the robot control device 30 by wireless. In addition, the wired communication may be serial communication or parallel communication based on another standard, instead of the serial communication based on the CAN standard.

Figure 2:
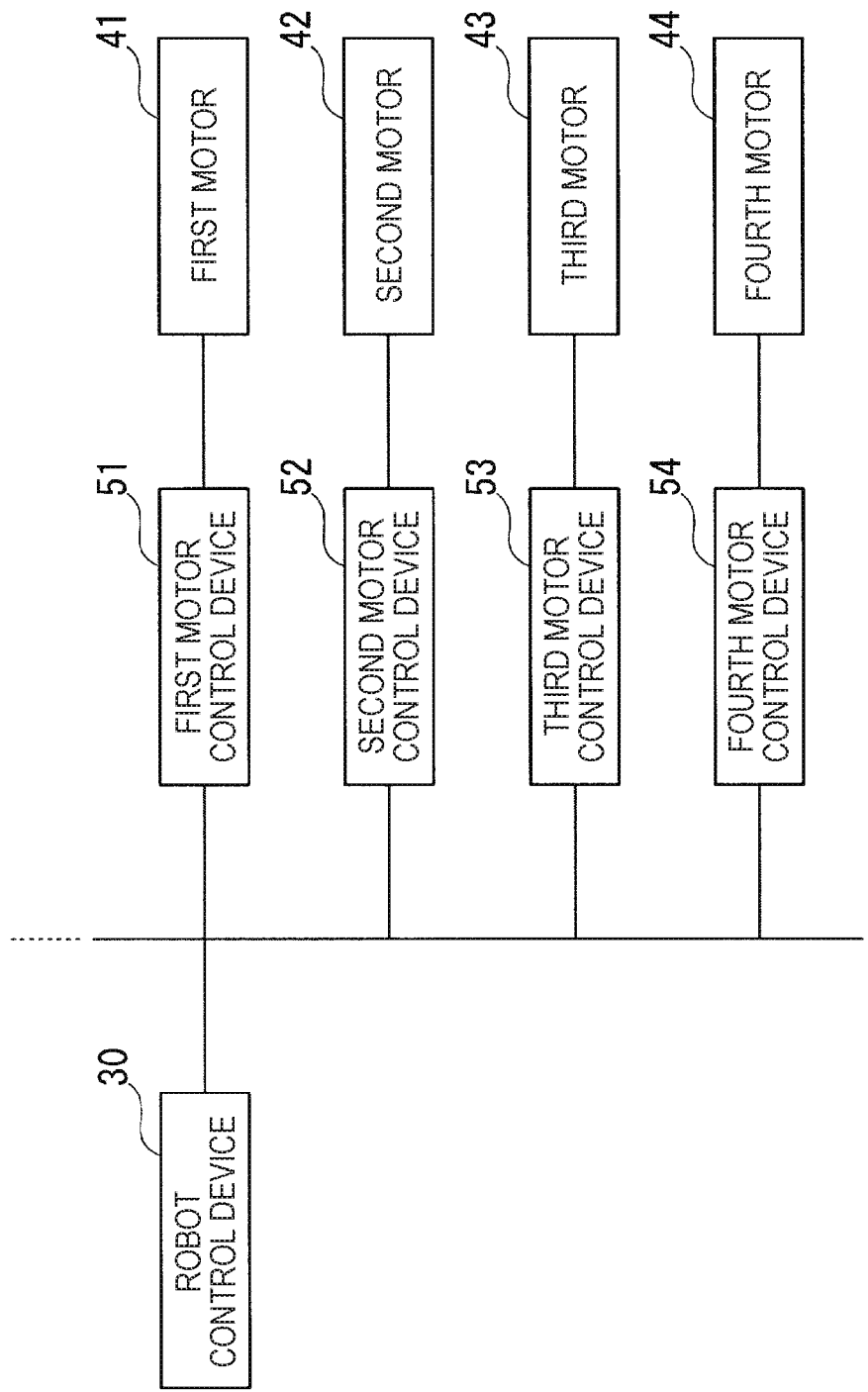
FIG. 2 is a diagram illustrating an example of a connection state between a robot control device and each of motor control devices.

Here, FIG. 2 is a diagram illustrating an example of a connection state between the robot control device 30 and each of motor control devices 5. As illustrated in FIG. 2, the robot control device 30 and each of the motor control devices 5 perform the serial communication.

The robot control device 30 is a controller that controls the robot 1. The robot control device 30 operates the robot 1 by causing each of the motor control devices 5 to control each of the motors 4. That is, in the example, the robot control device 30 operates the robot 1 by the distributed control which causes at least a part of processes for controlling each of the motors 4, performed by the robot control device 30 to distribute to each of the motor control devices 5. Therefore, the robot control device 30 causes the robot 1 to perform a predetermined operation.

Outline of Processes Performed by Robot Control Device and Motor Control Device

Hereinafter, an outline of a process performed by each of the robot control device 30 and the motor control device 5 in the distributed control by the robot control device 30 will be described.

The robot control device 30 performs transmission and reception of a plurality of pieces of information defined by a predetermined frame between the motor control devices 5 at every predetermined communication cycle. In the frame, the plurality of pieces of information are arranged in a predetermined order. That is, the robot control device 30 performs transmission and reception of the plurality of pieces of information between the motor control devices 5 at every predetermined communication cycle in the predetermined order. In addition, in the frame, the number of bits of each of the plurality of pieces of information is predetermined for each piece of information. In addition, the plurality of pieces of information include control information including a control parameter for controlling each of the motor control devices 5 by the robot control device 30, various kinds of information that is transmitted from each of the motor control devices 5 to the robot control device 30, or the like. The communication cycle is, for example, 2 milliseconds. Moreover, the communication cycle may be a cycle shorter than 2 milliseconds or may be a cycle longer than 2 milliseconds instead of 2 milliseconds. In addition, the communication cycle may include an error of at least substantially ±10%. Here, FIG. 3 is a diagram illustrating an example of the plurality of pieces of information defined by the frame in the embodiment.

Figure 3:
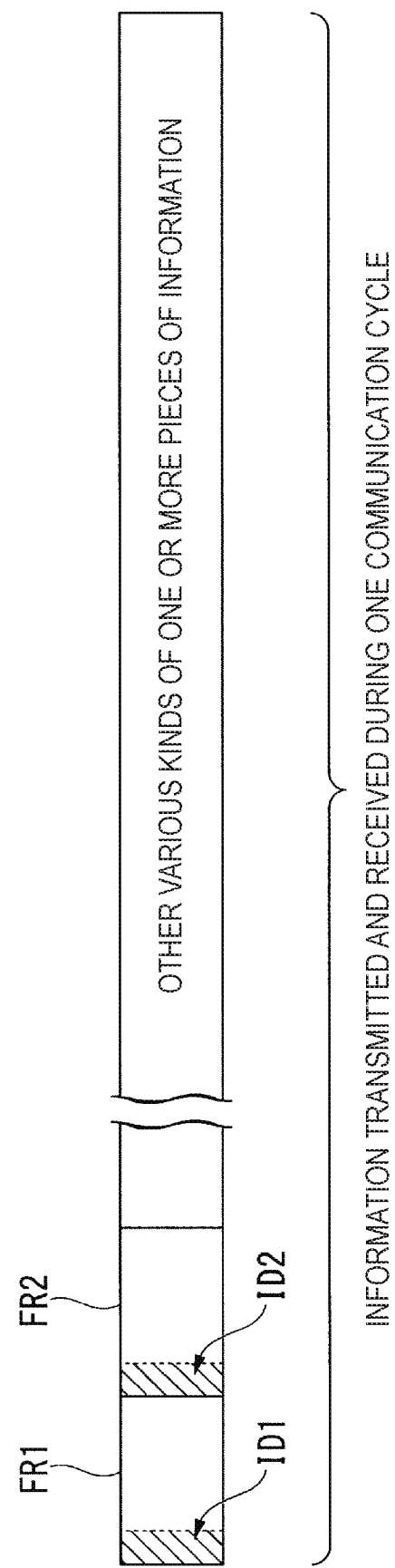
FIG. 3 is a diagram illustrating a plurality of pieces of information defined by a frame in the embodiment.

The robot control device 30 performs transmission and reception of the plurality of pieces of information defined by the frame illustrated in FIG. 3 at every communication cycle, that is, information FR1, information FR2, and other various kinds of one or more pieces of information between the motor control devices 5. In the frame, each of the information FR1, the information FR2, and the other various kinds of one or more pieces of information is arranged in the order of the information FR1, the information FR2, and the other various kinds of one or more pieces of information. In addition, in the frame, each of the other various kinds of one or more pieces of information is arranged in a predetermined order. Moreover, in FIG. 3, information for synchronizing the serial communication based on the CAN is omitted.

The information FR1 includes identification information ID1 for identifying the information FR1 and a first control parameter. The first control parameter includes a control parameter indicating a rotation angle at which the first motor 41 is rotated and a control parameter indicating a rotation angle at which the second motor 42 is rotated. That is, the information FR1 is control information for causing the first motor control device 51 to rotate the first motor 41 and control information for causing the second motor control device 52 to rotate the second motor 42. In a case where the first motor control device 51 receives the information FR1, the first motor control device 51 rotates the first motor 41 based on the control parameter indicating the rotation angle at which the first motor 41 is rotated, in the control parameters included in the first control parameter. In addition, in a case where the second motor control device 52 receives the information FR1, the second motor control device 52 rotates the second motor 42 based on the control parameter indicating the rotation angle at which the second motor 42 is rotated, in the control parameters included in the first control parameter. Moreover, the first control parameter may be configured to include other parameters such as a control parameter indicating a command causing the first motor control device 51 to rotate the first motor 41 at the rotation angle indicated by the control parameter, and a control parameter indicating a command causing the second motor control device 52 to rotate the second motor 42 at the rotation angle indicated by the control parameter.

The information FR2 includes identification information ID2 for identifying the information FR2 and a second control parameter. The second control parameter includes a control parameter indicating a rotation angle at which the third motor 43 is rotated and a control parameter indicating a rotation angle at which the fourth motor 44 is rotated. That is, the information FR2 is control information for causing the third motor control device 53 to rotate the third motor 43 and control information for causing the fourth motor control device 54 to rotate the fourth motor 44. In a case where the third motor control device 53 receives the information FR2, the third motor control device 53 rotates the third motor 43 based on a control parameter indicating a rotation angle at which the third motor 43 is rotated, in the control parameters included in the second control parameter. In addition, in a case where the fourth motor control device 54 receives the information FR2, the fourth motor control device 54 rotates the fourth motor 44 based on a control parameter indicating a rotation angle at which the fourth motor 44 is rotated, in the control parameters included in the second control parameter. Moreover, the second control parameter may be configured to include other parameters such as a control parameter indicating a command causing the third motor control device 53 to rotate the third motor 43 at the rotation angle indicated by the control parameter, and a control parameter indicating a command causing the fourth motor control device 54 to rotate the fourth motor 44 at the rotation angle indicated by the control parameter.

The robot control device 30 performs transmission and reception of each of the information FR1, the information FR2, and the other various kinds of one or more pieces of information between the motor control devices 5 in the order predetermined by the frame, in each frame. In addition, the robot control device 30 multicast-transmits information to each of the motor control devices 5, which is transmitted from the robot control device 30 to each of the motor control devices 5, in each of the information FR1, the information FR2, and the other various kinds of one or more pieces of information, in each frame. Therefore, each of the motor control devices 5 receives the information FR1 at every communication cycle. Each of the motor control devices 5 can use the identification information ID1 included in the information FR1 received at every communication cycle as synchronization information for synchronizing a time of arbitrary operation between the motor control devices 5. In the example, in a case where each of the motor control devices 5 receives the identification information ID1 included in the information FR1 from the robot control device 30, each of the motor control devices 5 determines that the synchronization information is received. Each of the motor control devices 5 controls each of the motors 4 that is the control target at a predetermined cycle based on a time at which the identification information ID1 is received. For example, each of the motor control devices 5 controls each of the motors 4 until the predetermined cycle has elapsed from the time. In addition, for example, each of the motor control devices 5 controls each of the motors 4 until a predetermined cycle has elapsed from a time at which a predetermined time has elapsed from the above-described time. Hereinafter, in a case of being referred to the synchronization information, it means synchronization information for synchronizing the time of arbitrary operation between the motor control devices 5. Moreover, the synchronization of the time may include an error of at least substantially ±10%. In addition, the predetermined cycle may include an error of at least substantially ±10%.

Moreover, the robot control device 30 may transmit information that is different from the identification information ID1 and does not change in each frame to each of the motor control devices 5 as the synchronization information, instead of the identification information ID1 included in the information FR1 in each frame. That is, each of the motor control devices 5 may receive information that is different from the identification information ID1 and does not change in each frame from the robot control device 30 as the synchronization information instead of the identification information ID1 included in the information FR1 in each frame. For example, the information may be information included in the information FR1, may be information included in the other various kinds of one or more pieces of information, or may be another kind of information different from any one of the information FR1, the information FR2, and the other various kinds of one or more pieces of information (that is, the robot control device 30 may separately transmit information including the control parameter and information indicating the synchronization information in each frame).

As described above, since the robot control device 30 transmits the information FR1 to each of the motor control devices 5 as the synchronization information, in the robot 1, each wiring connecting the robot control device 30 and each of the motor control devices 5 to each other may not include wiring used only for transmission of the synchronization information. As a result, in the robot 1, the robot control device 30 can cause the motor control device 5 to control the motor 4 that is the control target at the predetermined cycle even if the wiring is not provided.

Here, a motor control device X (for example, a motor control device of the related art or the like) different from the motor control device 5 receives the information FR1 from the robot control device 30 at every communication cycle and controls the motor 4 at every communication cycle as the predetermined cycle which is described above. However, in a case where a certain load is applied to the robot control device 30, the cycle at which the information FR1 is transmitted from the robot control device 30 may be shifted from the communication cycle. In this case, the motor control device X receives the information FR1 at a cycle shifted from the communication cycle. As a result, the motor control device X controls the motor 4 at the cycle.

In order to reduce the shift occurring between the communication cycle of the robot control device 30 and the predetermined cycle at which the motor control device 5 controls the motor 4, each of the motor control devices 5 calculates the predetermined cycle at which the motor 4 is controlled based on a time (or a time interval for receiving the information FR1 from the robot control device 30 in the past) at which the information FR1 is received from the robot control device 30 in the past. In a case where each of the motor control devices 5 receives the information FR1 from the robot control device 30, each of the motor control devices 5 controls each of the motors 4 at a calculated predetermined cycle based on the time at which the information FR1 (more specifically, the identification information ID1) is received. Hereinafter, a process of calculating the predetermined cycle by each of the motor control devices 5 will be described in detail.

Hardware Configuration of Robot Control Device

Figure 4:
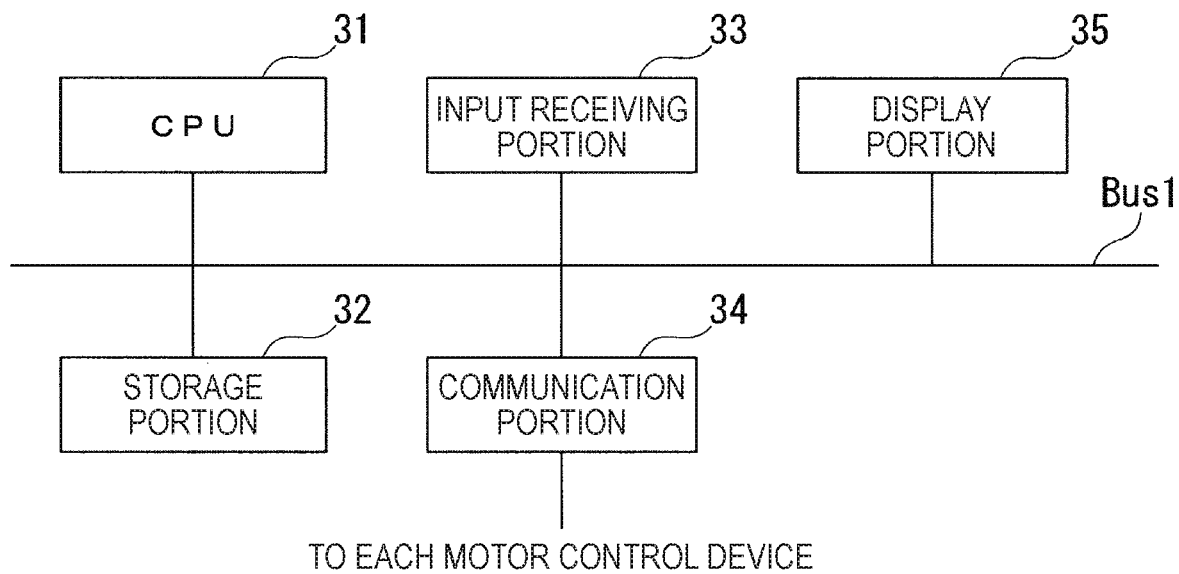
FIG. 4 is a diagram illustrating an example of a hardware configuration of the robot control device.

Hereinafter, a hardware configuration of the robot control device 30 will be described with reference to FIG. 4. FIG. 4 is a diagram illustrating an example of the hardware configuration of the robot control device 30.

The robot control device 30 includes, for example, a central processing unit (CPU) 31, a storage portion 32, an input receiving portion 33, a communication portion 34, and a display portion 35. These configuration elements are connected to one another to be capable of communicating with each other via a bus Bus 1. In addition, the robot control device 30 performs communication with each of the motor control devices 5 via the communication portion 34.

The CPU 31 executes various programs stored in the storage portion 32.

The storage portion 32 includes, for example, a hard disk drive (HDD), a solid state drive (SSD), an electrically erasable programmable read-only memory (EEPROM), a read-only memory (ROM), a random access memory (RAM), or the like. Moreover, the storage portion 32 may be an external storage device connected by a digital input/output port such as a USB instead of being built in the robot control device 30. The storage portion 32 stores various kinds of information which are processed by the robot control device 30, various programs including an operation program for operating the robot 1, various images, or the like.

The input receiving portion 33 is, for example, a keyboard, a mouse, a touch pad, or another input device. Moreover, the input receiving portion 33 may be a touch panel which is integrally configured with the display portion 35 instead thereof.

The communication portion 34 includes, for example, a digital input/output port such as a USB, an Ethernet (registered trademark) port, or the like.

The display portion 35 is, for example, a liquid crystal display panel or an organic electro luminescence (EL) display panel.

Figure 5:
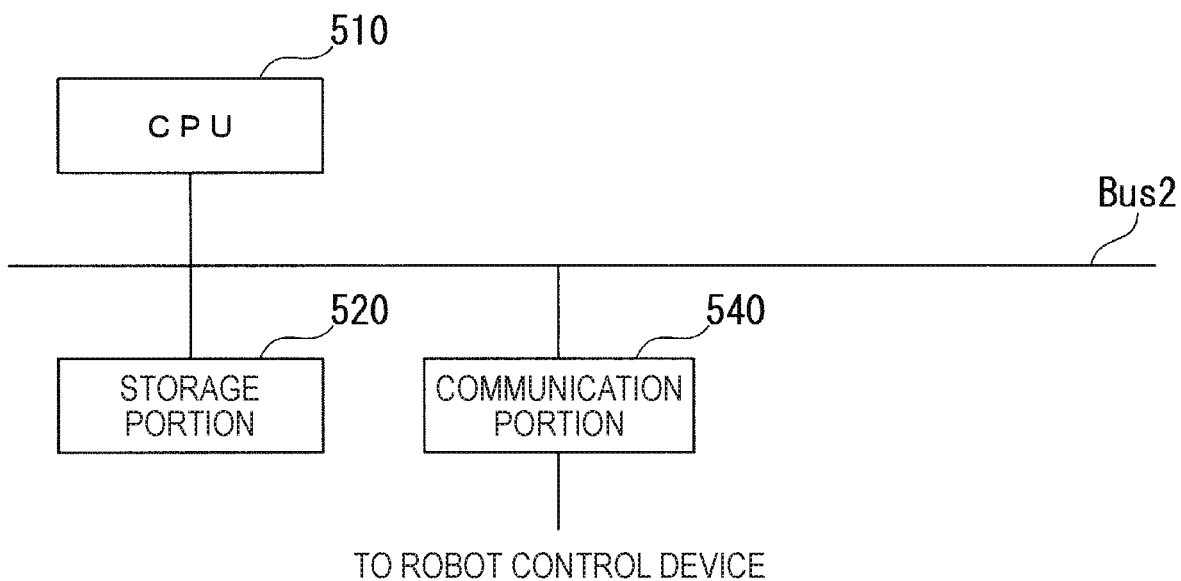
FIG. 5 is a diagram illustrating an example of a hardware configuration of the motor control device.

Hardware Configuration of Motor Control Device hereinafter, a hardware configuration of the motor control device 5 will be described with reference to FIG. 5. FIG. 5 is a diagram illustrating an example of the hardware configuration of the motor control device 5. That is, in the example, each of the motor control devices 5 includes the hardware configuration illustrated in FIG. 5. Moreover, a part or all of the motor control devices 5 may include another hardware functional portion in addition to hardware functional portions illustrated in FIG. 5.

The motor control device 5 includes, for example, a CPU 510, a storage portion 520, and a communication portion 540 as one micro-processing unit (MPU). These configuration elements are connected to each other to be able to communicate with each other via a bus Bus 2. In addition, the motor control device 5 performs communication with the robot control device 30 via the communication portion 540.

The CPU 510 executes various programs stored in the storage portion 520.

The storage portion 520 includes, for example, a register, an EEPROM, a ROM, a RAM, or the like. Moreover, the storage portion 520 may be an external storage device connected by, for example, a digital input/output port such as a USB instead of being built in the motor control device 5. The storage portion 520 stores various kinds of information which are processed by the motor control device 5.

The communication portion 540 includes, for example, a digital input/output port.

Functional Configuration of Robot Control Device

Figure 6:
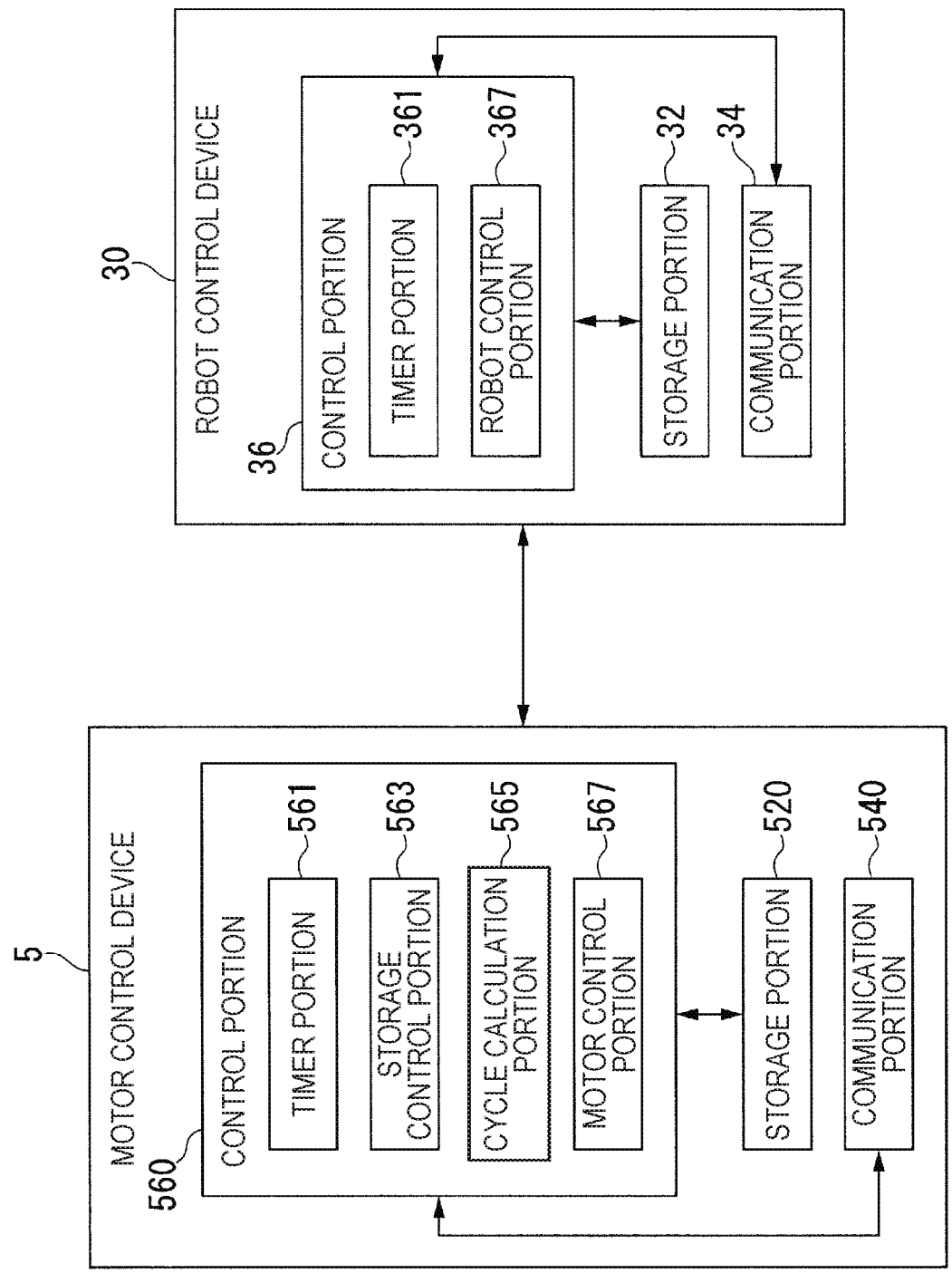
FIG. 6 is a diagram illustrating an example of functional configurations of the robot control device and the motor control device.

Hereinafter, functional configurations of the robot control device 30 and the motor control device 5 will be described with reference to FIG. 6. FIG. 6 is a diagram illustrating an example of functional configurations of the robot control device 30 and the motor control device 5.

The robot control device 30 includes the storage portion 32 and a control portion 36.

The control portion 36 controls the entire robot control device 30. The control portion 36 includes a timer portion 361 and a robot control portion 367. The functional portions included in the control portion 36 are realized, for example, by executing various programs stored in the storage portion 32 by the CPU 31. In addition, a part or all of the functional portions may be a hardware functional portion such as a large scale integration (LSI), or an application specific integrated circuit (ASIC).

The timer portion 361 clocks a time.

The robot control portion 367 performs transmission and reception of a plurality of pieces of information defined by the frame illustrated in FIG. 3 at every communication cycle based on the time clocked by the timer portion 361 between the motor control devices 5 via the communication portion 34. That is, the robot control portion 367 performs transmission and reception of the plurality of pieces of information at every communication cycle based on the operation program stored in the storage portion 32 in advance between the motor control devices 5 via the communication portion 34. Therefore, the robot control portion 367 can cause each of the motor control devices 5 to control each of the motors 4 so as to operate the robot 1.

The motor control device 5 includes the storage portion 520 and a control portion 560.

The control portion 560 controls the entire motor control device 5. The control portion 560 includes a timer portion 561, a storage control portion 563, a cycle calculation portion 565, and a motor control portion 567. These functional portions included in the control portion 560 are realized, for example, by executing various programs stored in the storage portion 520 by the CPU 510. In addition, a part or all of the functional portions may be a hardware functional portion such as an LSI or an ASIC.

The timer portion 561 clocks a time.

In a case where the motor control portion 567 receives the identification information ID1 from the robot control device 30 via the communication portion 540, the storage control portion 563 stores time point information indicating a time at which the identification information ID1 is received in the storage portion 520.

The cycle calculation portion 565 calculates the predetermined cycle based on a time which is indicated by the time point information stored in the storage control portion 563 and at which the motor control portion 567 receives the identification information ID1.

The motor control portion 567 receives a plurality of pieces of information transmitted from the robot control device 30 to the motor control device 5 at every communication cycle, in the plurality of pieces of information defined by the frame illustrated in FIG. 3. The motor control portion 567 performs processing according to at least a part of the plurality of pieces of information at a predetermined cycle calculated by the cycle calculation portion 565 based on the time at which the identification information ID1 included in the information FR1 is received, in the received information. The processing has, for example, processing of controlling the motor 4, processing of transmitting various kinds of information (for example, information indicating a current rotation angle of the motor 4) to the robot control device 30, or the like.

Processing of Calculating Predetermined Cycle by Motor Control Device

Figure 7:
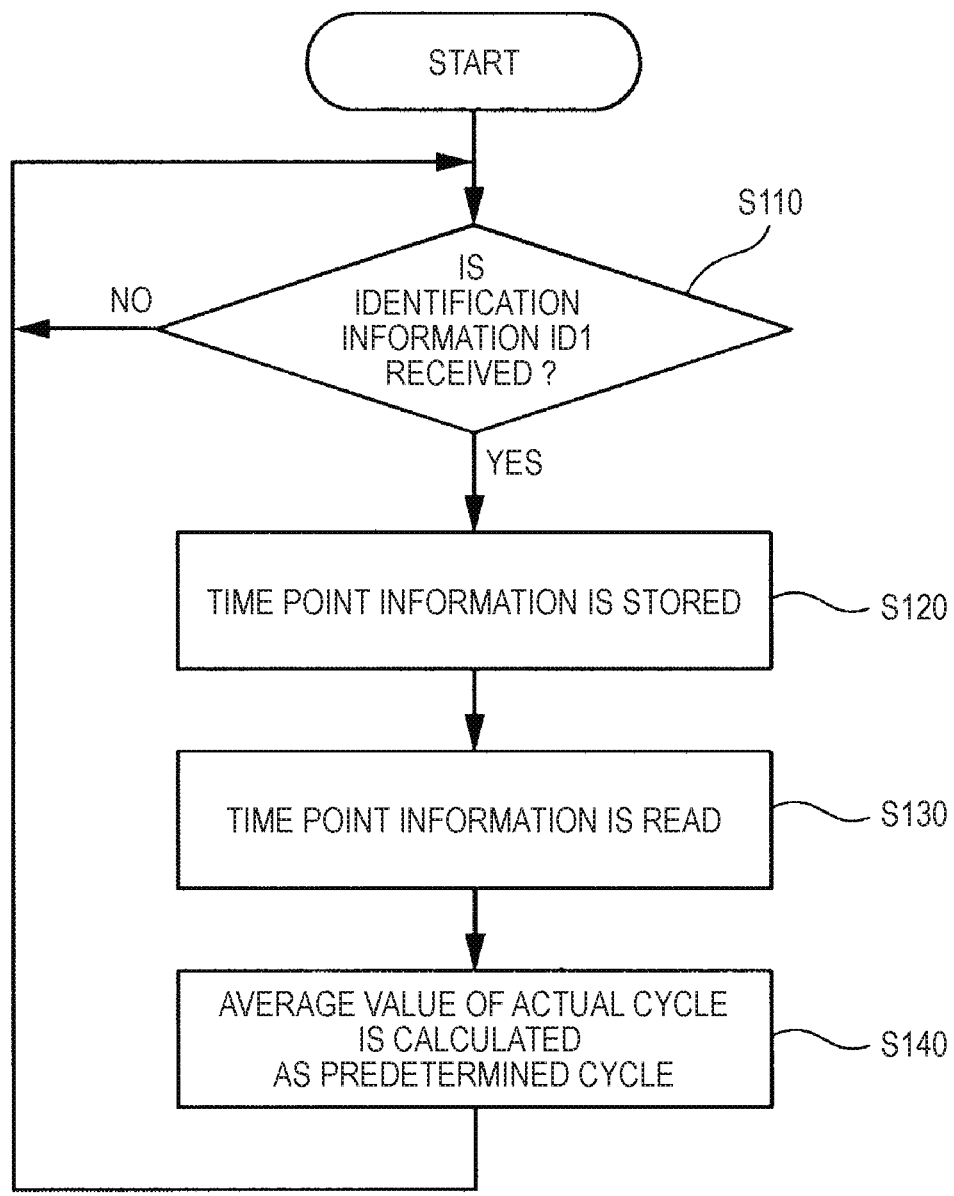
FIG. 7 is a flow chart illustrating an example of a flow of processing for calculating a predetermined cycle by the motor control device.

Processing of calculating a predetermined cycle by the motor control device 5 will be described with reference to FIG. 7. FIG. 7 is a flow chart illustrating an example of a flow of processing for calculating the predetermined cycle by the motor control device 5.

The motor control portion 567 is on standby until the identification information ID1 is received from the robot control device 30 (step S110). In a case where the motor control portion 567 determines that the identification information ID1 is received from the robot control device 30 (YES in step S110), the storage control portion 563 causes the storage portion 520, to store the time point information indicating the time at which the identification information ID1 is received (step S120). Here, the storage control portion 563 specifies the time based on a time clocked by the timer portion 561. In addition, in a case where the time point information stored in the storage portion 520 is a predetermined number of pieces of the time point information, the storage control portion 563 deletes the oldest time point information in the time point information and in the immediately preceding step S110, stores the time point information indicating the time at which the identification information ID1 is received in the storage portion 520 as the latest time point information. In the example, the predetermined number is 17. Moreover, the predetermined number may be any integer as long as it is an integer of 2 or more instead thereof.

Next, the cycle calculation portion 565 reads all of one or more pieces of the time point information stored in the storage portion 520 from the storage portion 520 (step S130).

Next, the cycle calculation portion 565 calculates an average value of an actual cycle as the predetermined cycle based on the predetermined pieces of the time point information read from the storage portion 520 in step S130 (step S140). Specifically, the cycle calculation portion 565 calculates a difference between adjacent time points as the actual cycle at every adjacent time points when each of the times indicated by the time point information is arranged in chronological order. For example, in a case where 17 pieces of the time point information are read from the storage portion 520 in step S150, the cycle calculation portion 565 calculates 16 actual cycles. In addition, for example, in a case where two pieces of the time point information are read from the storage portion 520 in step S150, the cycle calculation portion 565 calculates one actual cycle. The cycle calculation portion 565 calculates the average value of the calculated actual cycle as the predetermined cycle. Here, in a case where the calculated actual cycle is 1, the cycle calculation portion 565 specifies the actual cycle as the predetermined cycle. In addition, in a case where two pieces of the time point information are read from the storage portion 520 in step S150, the cycle calculation portion 565 specifies, for example, the communication cycle as the actual cycle.

Figure 8:
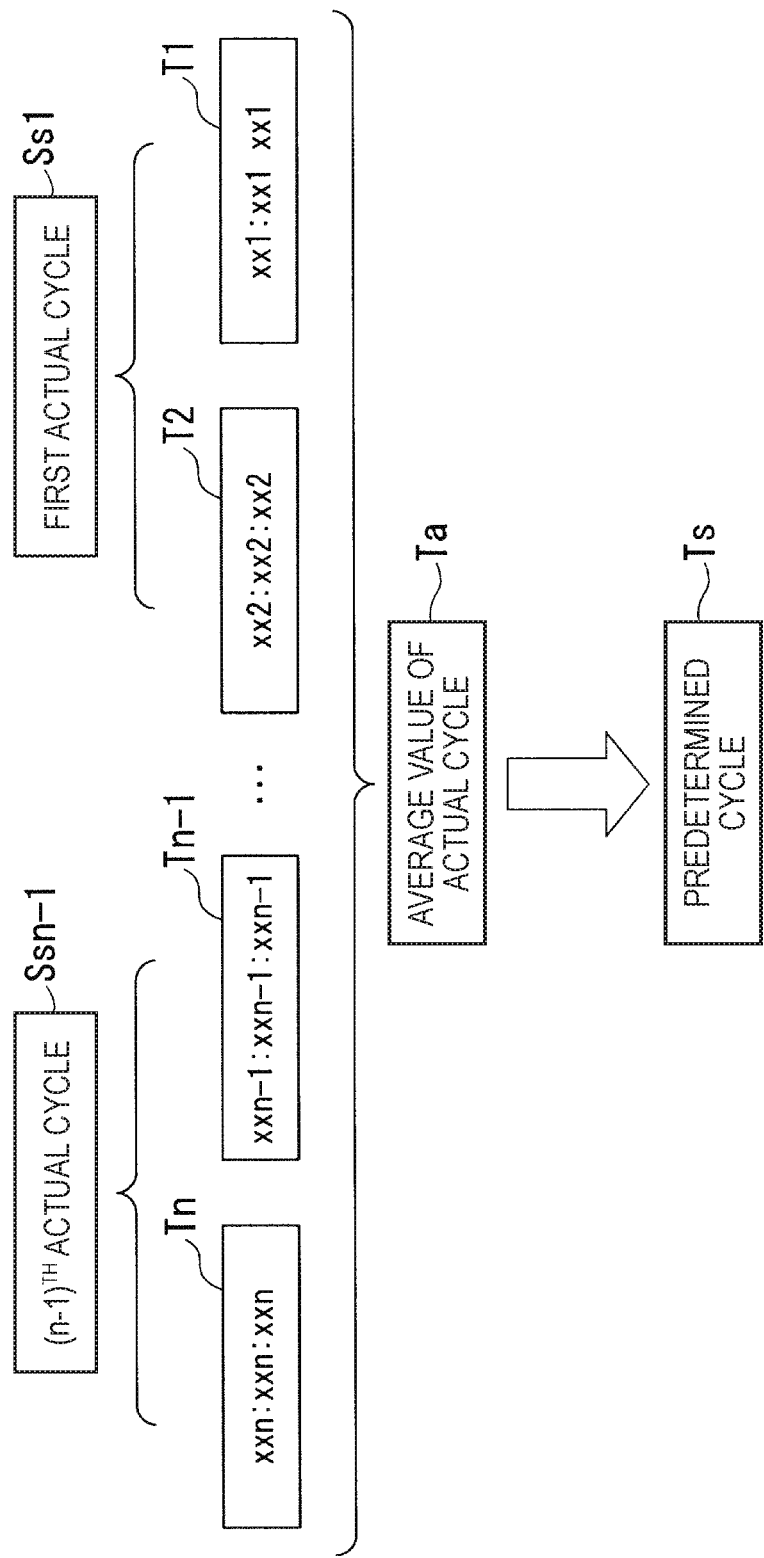
FIG. 8 is a diagram schematically illustrating an example of a flow of processing for calculating a predetermined cycle by a cycle calculation portion.

FIG. 8 is a diagram schematically illustrating an example of processing for calculating the predetermined cycle by the cycle calculation portion 565. Moreover, the older time in the adjacent time points is an example of a first time point and the newer time in the adjacent time points is an example of a second time point. In addition, the identification information ID1 received by the motor control portion 567 at the time of the older one between the adjacent time points is an example of first information. In addition, the information FR2 received by the motor control portion 567 at the time of the newer one between the adjacent time points is an example of second information.

In the example illustrated in FIG. 8, the predetermined number is represented by n. Here, n is an integer of 2 or more. In addition, each of the time point T1 to the time point Tn which are the n time points illustrated in FIG. 8 represents a time point indicated by each of the predetermined pieces of the time point information stored in the storage portion 520. In step S140, the cycle calculation portion 565 calculates the difference between the adjacent time points as each of an actual cycle Ss1 to an actual cycle Ssn−1 at every adjacent time points when the time point T1 to the time point Tn are arranged in chronological order. The cycle calculation portion 565 calculates an average value Ta of the actual cycle Ss1 to the actual cycle Ssn−1 based on the calculated actual cycle Ss1 to the actual cycle Ssn−1 as a predetermined cycle Ts.

Here, the cycle calculation portion 565 calculates the average value Ta of the actual cycle Ss1 to the actual cycle Ssn−1 by a low-pass filter. Moreover, the cycle calculation portion 565 may be configured to calculate the average value Ta by another method instead of the low-pass filter. In addition, the cycle calculation portion 565 may be configured to calculate a value based on a regression calculation in which each of the actual cycle Ss1 to the actual cycle Ssn−1 is fitted by a polynomial or the like as the predetermined cycle instead of the configuration in which the average value Ta is calculated as the predetermined cycle Ts.

The motor control device 5 calculates (or specifies) the predetermined cycle as described above. Therefore, the motor control device 5 can control the motor 4, for example, at the calculated (or specified) predetermined cycle. As a result, the motor control device 5 can reduce fluctuation of the predetermined cycle in a case where the cycle at which the information FR1 is transmitted by the robot control device 30 fluctuates from the communication cycle due to a load on the robot control device 30. That is, in the example, in the robot 1, the motor control device 5 can control the motor 4 at the cycle of substantially 2 milliseconds even in this case.

Moreover, the cycle calculation portion 565 may be configured to calculate the predetermined cycle based on a part of the predetermined pieces of the time point information read from the storage portion 520. For example, the cycle calculation portion 565 may be configured to calculate the predetermined cycle based on a plurality of pieces of the time point information randomly selected from the predetermined pieces of the time point information read from the storage portion 520 may be configured to select the time point information satisfying a predetermined selection conditions from the predetermined pieces of the time point information read from the storage portion 520 and calculate the predetermined cycle based on the selected time point information, and the like, or may be configured to exclude the time point information satisfying a predetermined exclusion condition from the predetermined pieces of the time point information read from the storage portion 520 and calculate the predetermined cycle based on time point information remaining without being excluded, and the like. The selection condition is, for example, a time point in odd order or even order in a case where a time point indicated by each of the plurality of pieces of the time point information is arranged in chronological order. Moreover, the selection condition may be another condition instead thereof. The exclusion condition is the time point in which the difference between before and after time points in chronological order exceeds a predetermined threshold value, in each time point in a case where the time point indicated by each of the plurality of pieces of the time point information is arranged in chronological order. Moreover, the exclusion condition may be another condition instead thereof.

After the process of step S140 is performed, the motor control portion 567 transitions to step S110 and is on standby until the identification information ID1 is received again from the robot control device 30.

Moreover, in the example, in the robot 1, the motor control device 5 is provided in the motor 4. Therefore, in the robot 1, the robot control device 30 can be reduced in size compared to a case where the robot control device 30 and the motor control device 5 are integrally configured. However, in the robot 1, the motor control device 5 is configured separately from the motor 4 and may be provided in an object different from the motor 4.

In addition, in the example, as described in FIG. 7, the motor control device 5 is configured to calculate the predetermined cycle with the reception of the information FR1 from the robot control device 30 as a trigger. However, the motor control device 5 may be configured to calculate the predetermined cycle with the reception of the information for allowing processing of calculating the predetermined cycle to be executed by the motor control device 5 from the robot control device 30 as a trigger.

As described above, in the robot 1, the second control device (motor control device 5 in the example) controls the control target (motor 4 in the example) controlled by the second control device at the predetermined cycle, and the predetermined cycle is obtained based on the first information (identification information ID1 in the example) received by the second control device from the first control device at the first time point, and the second information (information FR2 in the example) received by the second control device from the first control device at the second time point.

Therefore, in the robot 1, fluctuation of the predetermined cycle at which the second control device controls the control target can be suppressed.

In addition, in the robot 1, at every plurality of the second control devices, the second control device controls the control target controlled by the second control device at the predetermined cycle, and the predetermined cycle is obtained based on the first information received by the second control device from the first control device at the first time point and the second information received by the second control device from the first control device at the second time point. Therefore, in the robot 1, it is possible to suppress fluctuation of the predetermined cycle at which the second control device controls the control target for each of the plurality of second control devices.

In addition, in the robot 1, the communication between the first control device and the second control device is the serial communication. Therefore, in the robot 1, it is possible to suppress fluctuation of the predetermined cycle at which the second control device communicating with the first control device by the serial communication controls the control target.

In addition, in the robot 1, the standard of the serial communication is the controller area network. Therefore, in the robot 1, it is possible to suppress fluctuation of the predetermined cycle at which the second control device communicating with the first control device by the serial communication which is performed based on the controller area network controls the control target.

In addition, in the robot 1, the first information and the second information include the control parameters. Therefore, in the robot 1, it is possible to suppress fluctuation of the predetermined cycle at which the second control device controls the control target based on the first information including the control parameters and the second information including the control parameters.

In addition, in the robot 1, the second control device controls the motor 4 controlled by the second control device at the predetermined cycle, and the predetermined cycle is obtained based on the first information received by the second control device from the first control device at the first time point and the second information received by the second control device from the first control device at the second time point. Therefore, in the robot 1, it is possible to suppress fluctuation of the predetermined cycle at which the second control device controls the motor.

Moreover, in the robot 1, the second control device is provided in the motor. Therefore, in the robot 1, it is possible to reduce the first control device in size compared to a case where the first control device and the second control device are integrally configured.

Moreover, in the robot 1, the first control device is provided inside the base (base B1 in the example). Therefore, in the robot 1, it is possible to reduce the exclusive area of the range in which the robot 1 is installed compared to a case where the first control device is provided outside the base.

In addition, in the robot 1, the wiring connecting the first control device and the second control device to each other does not include the wiring used only for the transmission of the synchronization information. Therefore, in the robot 1, it is possible to cause the second control device to control the control target of the second control device at the predetermined cycle without having the wiring used only for the transmission of the synchronization information for synchronizing the first control device and the second control device.

Therefore, in the robot system, the second control device controls the control target controlled by the second control device at the predetermined cycle, and the predetermined cycle is obtained based on the first information received by the second control device from the first control device at the first time point and the second information received by the second control device from the first control device at the second time point. Therefore, in the robot system, it is possible to suppress fluctuation of the predetermined cycle at which the second control device controls the control target.

Although the embodiment of the invention is described in detail with reference to the drawings, the specific configuration is not limited to the embodiment, and modifications, substitutions, deletions, or the like may be made without departing from the spirit of the invention.

In addition, it is also possible to record a program for realizing a function of an arbitrary configuration portion in the above-described device (for example, the robot control device 30 and the motor control device 5) on a computer readable recording medium, the program may be read and executed in a computer system. Moreover, the "computer system" referred to here includes hardware such as an operating system (OS) or a peripheral device. In addition, the "computer-readable recording medium" refers to a portable medium such as a flexible disk, a magneto-optical disk, a ROM, or a compact disk (CD)-ROM, and a storage device such as a hard disk built in a computer system. Furthermore, the "computer-readable recording medium" includes a medium that holds a program at a certain period of time such as a volatile memory (RAM) inside the computer system serving as a server or a client in a case where a program is transmitted via a network such as the Internet or a communication line such as a telephone line.

In addition, the above-described program may be transmitted from a computer system where the program is stored in a storage device or the like to another computer system via a transmission medium or by a transmission wave in the transmission medium. Here, the "transmission medium" for transmitting a program refers to a medium having a function of transmitting information such as a network (communication network) such as the Internet or a communication line (communication line) such as a telephone line.

In addition, the above-described program may be used for realizing a part of the above-described functions. Furthermore, the above-described program may be a so-called difference file (difference program) which can realize the above-described function by a combination with a program already recorded in the computer system.

The entire disclosure of Japanese Patent Application No. 2016-225732, filed Nov. 21, 2016 is expressly incorporated by reference herein.

What is claimed is:

1. A robot comprising:
a first control device configured to send first, second, and third information; and
one or more second control devices to be controlled by the first control device, each of the second control devices controlling a control target at a predetermined cycle, each of the second control devices having a memory and a processor, the memory being configured to store a program, the processor being configured to execute the program so as to:
receive the first information from the first control device;
save a first time at which the first information is received in the memory;

receive the second information from the first control device;
save a second time at which the second information is received in the memory;
receive the third information from the first control device;
save a third time at which the third information is received in the memory;
calculate a first period of time between the first time and the second time;
calculate a second period of time between the second time and the third time;
calculate a mean period of time based on the first period of time and the second period of time; and
designate the mean period of time as the predetermined cycle.

2. The robot according to claim 1,
wherein communication between the first control device and each of the second control devices is serial communication.

3. The robot according to claim 2,
wherein a standard of the serial communication is a controller area network.

4. The robot according to claim 1,
wherein the first information and the second information include control parameters.

5. The robot according to claim 1,
wherein the control target is a motor.

6. The robot according to claim 5,
wherein each of the second control devices is provided in a corresponding one of the motors.

7. The robot according to claim 1, further comprising:
a base that supports a movable portion,
wherein the first control device is provided inside the base.

8. A robot system comprising:
a robot having:
  a base;
  an arm connected to the base; and
  a motor disposed in the arm and the motor being configured to rotate the arm relative to the base; and
a first control device configured to send first, second, and third information, and
one or more second control devices to be controlled by the first control device, each of the second control devices controlling a control target at a predetermined cycle, each of the second control devices having a memory and a processor, the memory being configured to store a program, the processor being configured to execute the program so as to:
receive the first information from the first control device;
save a first time at which the first information is received in the memory,
receive the second information from the first control device;
save a second time at which the second information is received in the memory;
receive the third information from the first control device;
save a third time at which the third information is received in the memory;
calculate a first period of time between the first time and the second time;
calculate a second period of time between the second time and the third time;
calculate a mean period of time based on the first period of time and the second period of time; and
designate the mean period of time as the predetermined cycle.

9. The robot system according to claim 8,
wherein communication between the first control device and each of the second control devices is serial communication.

10. The robot system according to claim 9,
wherein a standard of the serial communication is a controller area network.

11. The robot system according to claim 8,
wherein the first information and the second information include control parameters.

12. The robot system according to claim 8,
wherein the control target is a motor.

13. The robot system according to claim 12,
wherein each of the second control devices is provided in a corresponding one of the motors.

14. The robot system according to claim 8,
wherein the first control device is provided inside the base.

* * * * *